United States Patent [19]

Ichikawa et al.

[11] Patent Number: 4,695,235
[45] Date of Patent: Sep. 22, 1987

[54] BAG-CYLINDER CONTROL DEVICE IN A TIRE VULCANIZER

[75] Inventors: Wataru Ichikawa, Fuchu; Yuji Matsuki, Sayama; Yoshiaki Hirata; Mikiya Ito, both of Kodaira, all of Japan

[73] Assignees: Kabushiki Kaisha SG; Bridgestone Corporation, both of Tokyo, Japan

[21] Appl. No.: 914,376

[22] Filed: Oct. 1, 1986

[30] Foreign Application Priority Data

Oct. 3, 1985 [JP] Japan .............................. 60-220962

[51] Int. Cl.⁴ ...................... B29C 33/20; B29C 35/02
[52] U.S. Cl. ........................................ 425/29; 425/35; 425/52; 425/135; 425/150
[58] Field of Search ................... 425/29, 23, 27, 35, 425/51, 52, 53, 135, 150

[56] References Cited

U.S. PATENT DOCUMENTS

| | | | |
|---|---|---|---|
| 3,380,115 | 4/1968 | Soderquist | 425/29 |
| 3,585,686 | 6/1971 | Balle | 425/23 |
| 4,022,554 | 5/1977 | MacMillan | 425/23 |

Primary Examiner—Willard E. Hoag
Attorney, Agent, or Firm—Spensley Horn Jubas & Lubitz

[57] ABSTRACT

A coil section for being excited by a primary ac signal and producing a secondary output signal is provided on the open end side of a bag-cylinder main body. A material consisting of such substance and having such configuration that bring about reluctance change of a magnetic circuit passing through the coil section in accordance with displacement of a piston rod of the bag-cylinder is provided in a predetermined pattern about the piston rod. In a detection circuit, position detection data representing the position of the piston rod is obtained in response to the secondary output signal from the coil section. In a position establishing circuit, stop position data representing a desired position at which the piston rod should be stopped is established depending upon the diameter of a tire to be vulcanized. In a comparison and control circuit, stopping of the piston rod is controlled, in a specified step in a sequence for vulcanizing the tire, in accordance with comparison between the established stop position data and the position detection data. This control device can readily cope with tires of different diameters simply by changing the stop position data.

5 Claims, 8 Drawing Figures

BAG-CYLINDER CONTROL DEVICE IN A TIRE VULCANIZER

BACKGROUND OF THE INVENTION

This invention relates to an improvement in a bag-cylinder control device in a tire vulcanizer.

In vulcanizing a tire by supplying vapor into a bag attached to a bag-cylinder in a tire vulcanizer, a piston rod of the bag-cylinder must be stopped at a predetermined intermediate position in its stroke depending upon the tire diameter. For this purpose, a mechanical type stopper has heretofore been attached to the bag-cylinder and the piston rod is stopped at the intermediate position by the action of this stopper.

The mechanical type stopper, however, requires a complicate mechanical structure to be provided about the bag-cylinder and, besides, the stopper must be replaced each time the diameter of the tire to be vulcanized has changed and this replacement of the stopper requires a troublesome work which takes much time.

It is, therefore, an object of the invention to provide a bag-cylinder control device in a tire vulcanizer eliminating the above described deffects in the prior art device.

SUMMARY OF THE INVENTION

The bag-cylinder control device in a tire vulcanizer according to the invention comprises a coil section provided on the open end side of a bag-cylinder main body for being excited by a primary ac signal and producing a secondary output signal, a material provided in a predetermined pattern about a piston rod of the bag-cylinder and consisting of such substance and having such configuration that brings about reluctance change of a magnetic circuit passing through the coil section in response to displacement of the piston rod, a detection circuit for producing position detection data representing position of the piston rod in response to the secondary output signal, position establishing means for establishing stop position data representing a desired position at which the piston rod should stop in accordance with the diameter of a tire to be vulcanized, and comparison and control means for controlling, in a specified step in a sequence for vulcanizing the tire, stopping of the piston rod in accordance with comparison between the established stop position data and the position detection data.

As is well known, a piston rod of a bag-cylinder is stretched to a predetermined position and a flexible tubular bag provided between the foremost end of the piston rod and the end portion of a cylinder main body is thereby stretched. A raw tire is mounted in this position and thereafter the piston rod is withdrawn to a predetermined intermediate position while vapor is supplied into the inside space of the bag. The piston rod is stopped in this withdrawn position and then vulcanization of the tire is performed in a state in which the raw tire is clamped between the bag disposed inside of the tire and a mold disposed outside of the tire.

According to the control device of the invention, stop position data is established in position establishing means in accordance with the diameter of a tire to be vulcanized and a stop control is performed in accordance with result of comparizon between this stop position data and position detection data from a detection circuit. In changing the diameter of a tire to be vulcanized, therefore, the establishment of stop position data in the position establishing means has only to be changed so that the operation involved in the change of the tire diameter is greatly simplified.

The invention will now be described in detail with reference to a preferred embodiment illustrated in the accompanying drawings.

BRIEF DESCRIPTION OF THE DRAWINGS

In the accompanying drawings.

DESCRIPTION OF A PREFERRED EMBODIMENT

Figure 1:
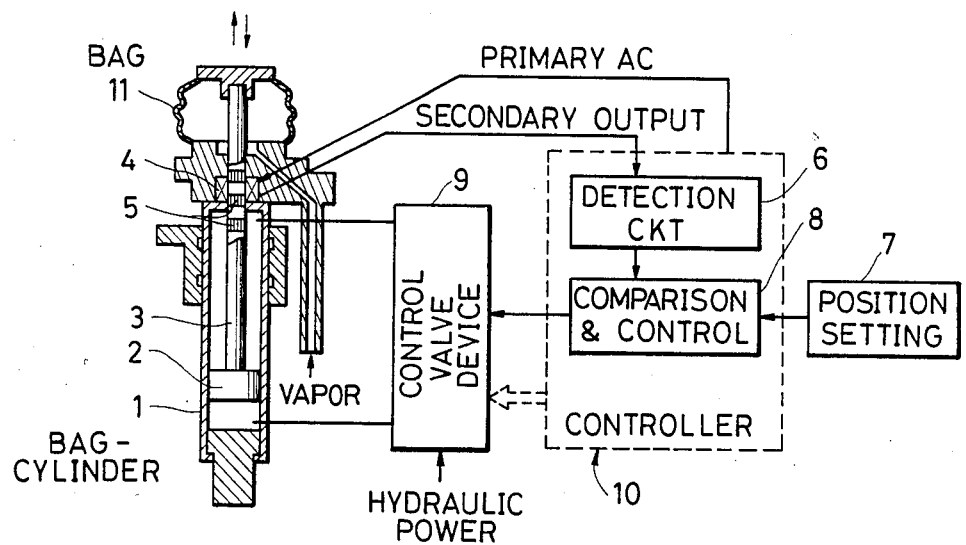
FIG. 1 is a diagram of an entire construction of an embodiment of the invention shown partly in section.

In FIG. 1, reference character 1 denotes a bag-cylinder main body, 2 a piston and 3 a piston rod. A coil section 4 is provided on the open end side of the cylinder main body 1. The coil section 4 is excited by a primary ac signal and produces a secondary output signal. A magnetic or conductive material 5 is provided in a predetermined pattern about the piston rod 3. A relative position of the material 5 with respect to the coil section 4 is changed in accordance with displacement of the piston rod 3 and reluctance of a magnetic circuit passing through the coil section 4 therby is changed. More specifically, if the material 5 consists of a magnetic substance, magnetic permeability increases in this portion and reluctance change corresponding to this increase takes place. If the material 5 consists of a conductive substance, an eddy current flows in this portion and reluctance change corresponding to the eddy current loss takes place. A secondary output signal corresponding to this reluctance change is taken out of the coil section 4 and is supplied to a detection circuit 6. In the detection circuit 6, position detection data representing the position of the piston rod 3 is obtained in response to the supplied secondary output signal. Position establishing means 7 establishes stop position data representing a desired position at which the piston rod 3 should be stopped. The position establishing means 7 consists of, e.g., a numerical value establishing switch or programmable data establishing means such as a sequencer. Comparison and control means 8 compares the stop position data established by the establishing means 7 with position detection data of the piston rod 3 detected by the detection circuit 6 and thereupon produces a control signal for controlling stopping of the piston rod 3 in accordance with result of the comparison. This comparison and control may include not only a mere comparison function but learning functions such as preparation (i.e., foreseeing an overrun during a stop control from speed and acceleration and controlling a stop timing on the basis of this foreseeing) and review (i.e., considering an error between an established position during a previous stop control and an actual stop position and performing a stop control so as not to produce this error). A control valve device 9 consists of a fluid pressure circuit (e.g., a hydraulic circuit) controlling the function of the bag-cylinder 1. The operation of the control valve device 9 is switched in response to a valve control signal from a controller 10 to control stretching, withdrawing and stopping of the piston 2 of the cylinder 1. The detection circuit 6 and the comparison and control means 8 are included in the controller 10. The control valve device 9 is controlled in response to a stop control signal provided by the comparison and control means 8 and the piston rod 3 thereby is stopped.

As the piston rod 3 is stretched to a predetermined position, a flexible tubular bag 11 provided between the foremost end of the piston rod 3 and the end portion of the cylinder main body is stretched and a raw tire (not shown) is mounted in this stretched position. Then the piston rod 3 is withdrawn to a predetermined intermediate position while vapor is supplied into the inside space of the bag 11. The piston rod 3 is stopped at this intermediate position and vulcanization of the raw tire is performed in a state in which the raw tire is clamped between the bag 11 disposed inside of the raw tire and a mold (not shown) disposed outside thereof. In this case, the stop position of the piston rod 3 must be varied depending upon the diameter of a tire. For this reason, stop position data is established in accordance with the diameter of a tire to be vulcanized and the stop control for the piston rod 3 is performed in accordance with result of comparison between this stop position data and the position detection data from the detection circuit 6. In changing the diameter of a tire to be vulcanized, therefore, establishment of the stop position data in the position establishment means 7 has only to be changed which involves a very simple operation.

Figure 2:
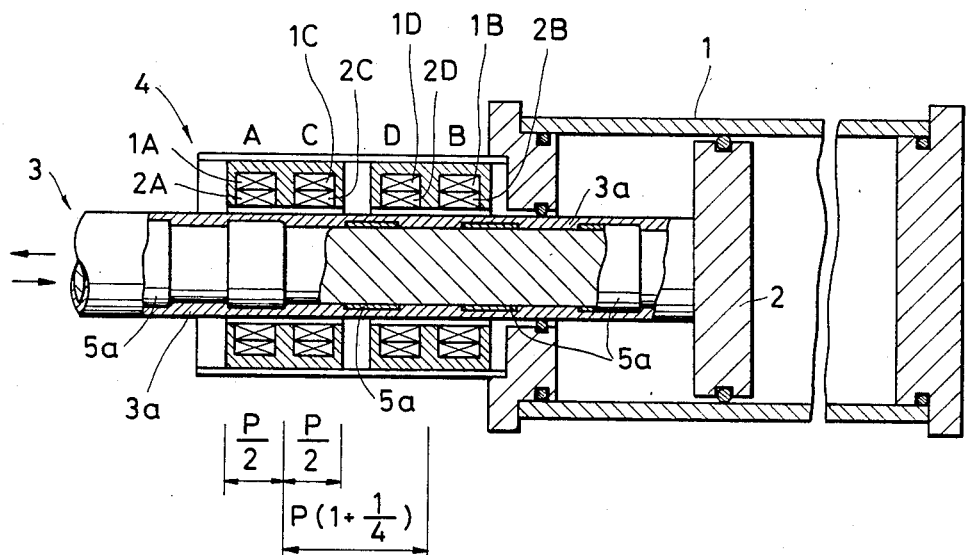
FIG. 2 is an enlarged sectional view of a specific example of a piston rod position detection device portion of a bag-cylinder shown in FIG. 1.

FIG. 2 shows, in an enlarged scale, an example of the coil section 4 and the material 5 provided about the piston rod 3. The coil section 4 includes primary coils 1A–1D and secondary coils 2A–2D and is fixed to the open end portion of the cylinder main body 1 in such a manner that the piston rod 3 penetrates through cylindrical coil spaces of these coils so that the coil spaces become concentric with the piston rod 3. A plurality of annular conductors $5a$ are provided about the piston rod 3 with an equal interval therebetween. The outer periphery of each of the conductors $5a$ is coated with a coating $3a$. These conductors $5a$ correspond to the material 5 in FIG. 1.

Width of each conductor $5a$ is P/2 (where P is any integer) and the conductor $5a$ is repeatedly provided with a predetermined interval in the direction of linear displacement of the piston rod 3. This conductor $5a$ consists of a weakly magnetic substance or a non-magnetic substance and also consists of a better conductive substance than the material of the piston rod 3. The conductors $5a$ may be made of, e.g., copper, aluminum or brass, or a material provided by mixing or combining such good conductor with other material.

In the present embodiment, the coils are operated in four phases which are distinguished from one another by reference characters A, B, C and D for the sake of convenience. The location of the respective coils and the size and configuration of the respective annular conductors $5a$ are so determined that, in accordance with relative positions of the conductors $5a$ with respect to the coils, reluctance produced in the respective phases A–D differs by 90 degrees from each adjacent phase. If, for example, the phase A is a cosine phase, the phase B is a sine phase, the phase C is a minus cosine phase and the phase D is a minus sine phase.

In the example of FIG. 2, corresponding ones of the primary coils 1A–1D and the secondary coils 2A–2D of the respective phases A–D are wound in the same location and the length of each coil is about "P/2". The coils 1A and 2A of the phase A are provided adjacent to the coils 1C and 2C of the phase C and the coils 1B and 2B of the phase B are provided adjacent to the coils 1D and 2D of the phase D. There is an interval of "$P(n \pm \frac{1}{4})$" (where n is any natural number) between the coil group of the phases A and C and the coil group of the phases B and D.

In the above described construction, flux produced in the primary coils 1A–1D of the respective phases passes through the piston rod 3 and, when the conductors $5a$ have entered this magnetic field, an eddy current flows along the rings of the conductors $5a$ in accordance with the amount of entry of these conductors $5a$. The more the conductors $5a$ have entered the coils (e.g., the state corresponding to the phase A in FIG. 2 at the maximum), the more is the amount of the eddy current which flows in the conductors $5a$. Conversely, in a state in which the conductors $5a$ have not entered the coils at all (e.g., the state corresponding to the phase C in FIG. 2), little or no eddy current flows in the conductors $5a$. In this manner, the eddy current flows through the conductors $5a$ in accordance with the degree of entry of the conductors $5a$ in the coils of the respective phases and reluctance change caused by the eddy current loss is produced in the magnetic circuits of the respective phases. An ac signal of a level corresponding to this reluctance change is induced in each of the secondary coils 2A–2D of the respective phases.

As the coating $3a$ provided about the outer periphery of the piston rod 3, a material which is less conductive than the conductors $5a$ or non-conductive and non-magnetic or weakly magnetic is employed. Chrome plating, for example, provides a preferred coating.

In FIG. 2, the piston rod 3 is inserted in the inside space of the coil section 4. The construction however is not limited to this but it may be modified according to necessity. The conductors $5a$, i.e., the material 5, may be formed in a spiral form instead of an annular form as in the present embodiment or may be formed in any other suitable pattern.

In the example of FIG. 2, the coating $3a$ is filled between the respective conductors $5a$. Alternatively, magnetic substance may be filled in these spaces (i.e., conductive substance portions and magnetic substance portions are alternately provided. By providing magnetic substance portions between conductive substance portions in which reluctance is relatively decreased, reluctance is further decreased in these portions with a result that width of reluctance change is widened so that resolution of detection is improved. The conductors $5a$ may be substituted by rings of magnetic substance disposed with the interval P/2. In this case, annular magnetic substance projections may be formed by cutting annular grooves about the piston rod 3, if the piston rod 3 is made of iron.

In the above described embodiment, an output signal corresponding to a linear position of a piston rod can be obtained according to the phase shift system. In the respective phases, a periodic reluctance change is produced with a linear displacement amount P constituting one period. The phase of this reluctance change differs by 90 degrees (P/4) between respective adjacent phases. If, accordingly, a phase angle corresponding to linear displacement is represented by $\phi$, the level of voltage induced in the secondary coils 2A–2D of the respective phases A–D can be substantially expressed by approximations $\cos \phi$ in the phase A, $\sin \phi$ in the phase B, $-\cos \phi$ in the phase C and $-\sin \phi$ in the phase D (2 being equivalent to P) in accordance with the linear position (i.e., $\phi$) of the piston rod 3. The primary coils 1A and 1C of the phases A and C are excited by a sine wave signal $\omega t$ and the primary coils 1B and 1D of the phases B and D are excited by a cosine wave signal $\cos \omega t$. In the pair of the phases A and C, output signals of the secondary coils 2A and 2C are added together in a differential manner and in the pair of the phases B and D, output signals of the secondary coils 2B and 2D are added together in a differential manner. The differential output signals of the respective pairs are added together to produce a final output signal Y. This output signal Y can be substantially expressed in the following approximation:

$$Y = \sin \omega t \cos \phi - (-\sin \omega t \cos \phi) + \cos \omega t \sin \phi - (-\cos \omega t \sin \phi)$$

$$= 2 \sin \omega t \cos \phi + 2 \cos \omega t \sin \phi$$

$$= 2 \sin (\omega t + \phi)$$

If the coefficient conveniently expressed by "2" in the above equation is substituted by a constant K which is determined depending upon various conditions, the above equation becomes $$Y = K \sin (\omega t + \phi)$$

Since $\phi$ corresponds to the linear position of the piston rod, the position of the piston rod can be detected by measuring the phase difference $\phi$ of the output signal Y corresponding to the primary ac signal $\sin \omega t$ (or $\cos \omega t$).

Figure 3:
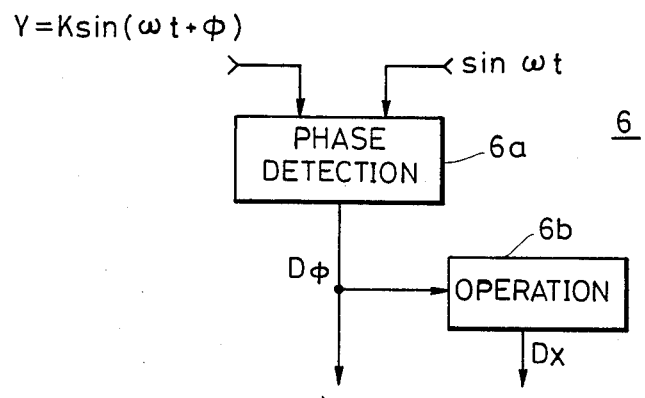
FIG. 3 is a block diagram showing an example of a detection circuit of FIG. 1.

A known phase difference detection circuit may be employed for obtaining the phase difference $\phi$ between the output composite signal Y of the secondary coils and the reference ac signal $\sin \omega t$ (or $\cos \omega t$). Phase difference data $D\phi$ thus obtained represents an absolute position of the piston rod within the range of the length P of one cycle of the periodic pattern of the conductor 5a. The present position of the piston rod 3 with respect to a predetermined origin can be specified by a combination of the phase difference data $D\phi$ and data Dx which represents the order of cycle of the conductor 5a which is now in the coil section 4 (this data Dx can be obtained by computing by suitable operation means the number of cycles of change in the data $D\phi$ accompanying the displacement of the piston rod 3). An example of the detection circuit 6 of FIG. 1 is shown in FIG. 3. In this example, the detection circuit 6 consists of a phase difference detection circuit 6a and an operation circuit 6b each performing the above described functions. In this circuit, the data $D\phi$ and Dx are obtained in accordance with the secondary output signal Y of the coil section 4 and position detection data representing the position of the piston rod 3 is obtained by combining the data $D\phi$ and Dx. The operation circuit 6b consists of, e.g., counting means counting the number of cycles of change in the data $D\phi$.

The signal processing system to be employed is not limited to the phase shift system described above but may be one which, as an ordinary transformer, rectifies a differential output of secondary coils to produce an analog voltage of a level corresponding to the linear position. In this case, the coil section may comprise only the phases A and C or the phases B and D.

The primary coils and the secondary coils need not be provided separately but, as disclosed in Japanese Preliminary Utility Model Publication No. 58-2621 or No. 58-39507, common coils may perform functions of both the primary and secondary coils.

Figure 4:
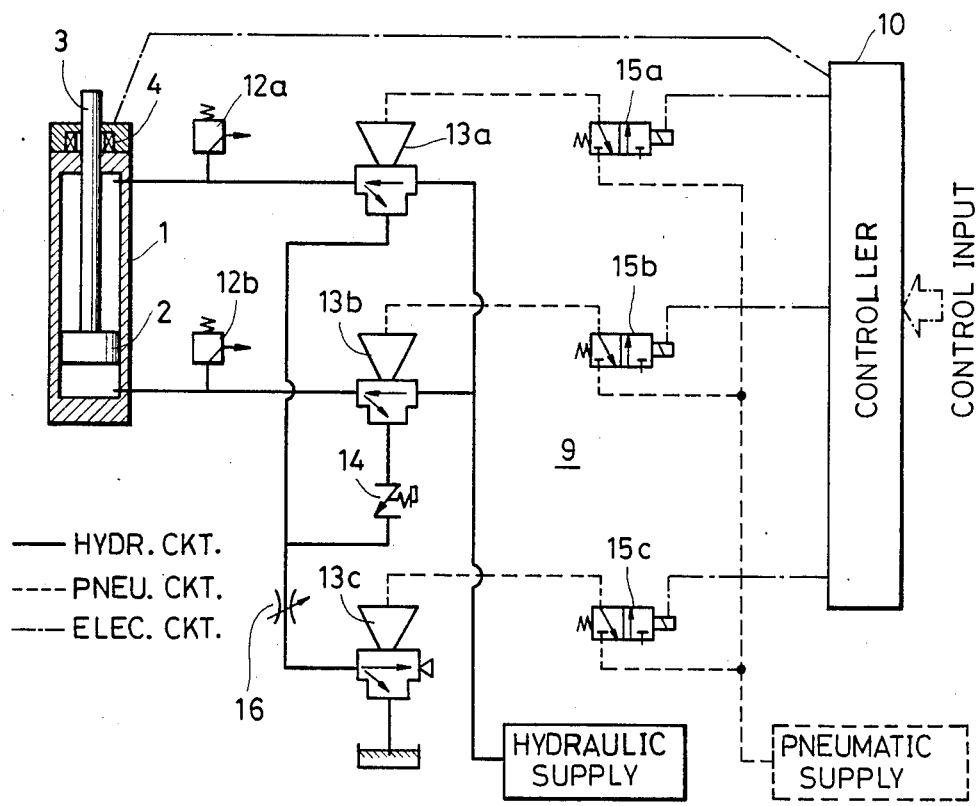
FIG. 4 is a fluid pressure circuit diagram showing an example of a control device of FIG. 1.

FIG. 4 shows an example of the control valve device 9 in which solid lines designate a hydraulic circuit, broken lines designate a pneumatic circuit and chain-and-dot lines designate an electric circuit. Reference characters 12a and 13b designate hydraulic relief valves, 13a–13c hydraulic piston valves, 14 a relief check valve, 15a–15c electromagnetic valves and 16 a speed controller, respectively. On-off states of the electromagnetic valves 15a–15c corresponding to four operation states "free", "lifting", "lowering" and "stop" of the bag-cylinder 1 are shown in the following Table 1.

TABLE 1

| operation | electro-magnetic valve | | |
|---|---|---|---|
| | 15a | 15b | 15c |
| free | on | off | off |
| lifting | on | on | off |
| lowering | on | off | off |
| stop | off | off | on |

Figures 5A, 5B, 5C, 5D:
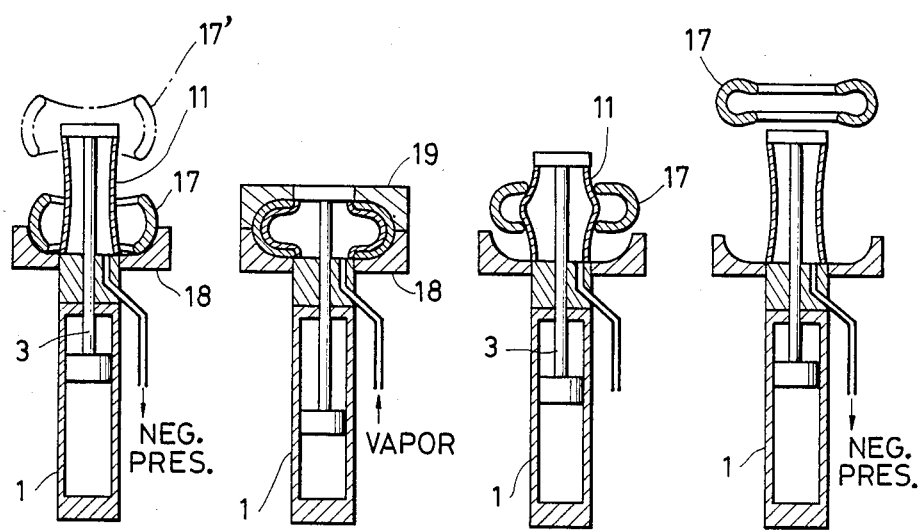
FIG. 5 is a shcematic view showing an example of the vulcanizing operation in this embodiment with respect to its principal steps.

FIG. 5 is a schematic view showing an example of operation of the bag-cylinder 1. FIG. 5a shows a state in which the piston rod 3 of the bag-cylinder 1 is stretched (lifted) to a predetermined lift position. In this state in which the bag 11 has been stretched, a raw tire 17 is inserted from the side of the foremost end portion of the piston rod 3 as shown by a chain-and-dot line 17' and placed on a lower mold 18. Then an upper mold 19 is mounted and the piston rod 3 is withdrawn (lowered) while vapor is supplied into the bag 11. The piston rod 3 is stopped at a predetermined intermediate position corresponding to the diameter of the tire 17 and supply of vapor is continued in this position to vulcanize the tire. FIG. 5(b) shows this state.

After completion of vulcanization, the upper mold 19 is removed and the piston rod 3 is lifted. FIG. 5(c) shows this state. While the piston rod 3 is lifted, gas inside the bag 11 is sucked under a negative pressure to reduce the diameter of the bag 11. When the piston rod 3 has reached a predetermined lift position as shown in FIG. 5(d), the vulcanized tire 17 is pulled off. Thereafter, the operation returns to the step shown in FIG. 5(a) with the piston rod 3 being held in the lift position shown in FIG. 5(d) and the operation shown in FIGS. 5(a) through 5(d) is repeated for a next new tire.

The stop position establishing data for the piston rod 3 is given in correspondence to the lift position shown in FIG. 5(a) or 5(d) and also to the intermediate stop position during vulcanization shown in FIG. 5(b). The flow of the vulcanization operation shown in FIGS. 5(a)–5(d) is controlled in response to a step signal provided by suitable means such as a sequencer (not shown) and necessary stop position establishing data is given according to a step which is being executed.

As described above, according to the invention, the stop control of the piston rod is performed in accordance with comparison between desired stop position establishing data and the present position of the piston rod of the bag-cylinder and, accordingly, the value of the stop position establishing data has only to be changed in changing the diameter of a tire to be vulcanized so that change in the operation can be made extremely easily. Further, since the piston rod position detection device consists of a coil section provided on the cylinder main body and material of a predetermined pattern provided on the piston rod, the detection device is of an integral construction with the cylinder so that the structure about the cylinder can be simplified to the maximum extent possible. Further, if a conductive substance is selected as the material provided on the piston rod, the material can be formed in a simple method such as copper plating so that processing of the rod is facilitated and the structure is further simplified.

What is claimed is:

1. A bag-cylinder control device in a tire vulcanizer comprising:
    a coil section provided on the open side of a bag-cylinder main body for being excited by a primary ac signal and producing a secondary output signal;
    a material provided in a predetermined pattern about a piston rod of said bag-cylinder and consisting of such substance and having such configuration that bring about reluctance change of a magnetic circuit passing through said coil section in response to displacement of said piston rod;
    a detection circuit for producing position detection data representing position of said piston rod in response to the secondary output signal;
    position establishing means for establishing stop position data representing a desired position at which said piston rod should stop in accordance with the diameter of a tire to be vulcanized; and
    comparison and control means for controlling, in a specified step in a sequence for vulcanizing the tire, stopping of said piston rod in accordance with comparison between the established stop position data and the position detection data.

2. A bag-cylinder control device in a tire vulcanzer as defined in claim 1 wherein said material consists of a closed ring provided about said piston rod and a plurality of said rings are provided with a predetermined interval therebetween.

3. A bag-cylinder control device in a tire vulcanizer as defined in claim 1 wherein said material is provided in a spiral form with a predetermined pitch.

4. A bag-cylinder control device in a tire vulcanizer as defined in claim 1 wherein said material consists of substance which is less magnetic than the material of said piston rod or non-magnetic and of good conductive substance.

5. A bag-cylinder control device in a tire vulcanizer as defined in claim 1 wherein said coil section comprises a plurality of primary coils and secondary coils corresponding to these primary coils, said respective primary coils are excited by primary ac signals of different phases so as to produce, as said secondary output signal, signals derived by phase-shifting the primary ac signals in accordance with the position of said piston rod.

* * * * *